Figure 4:
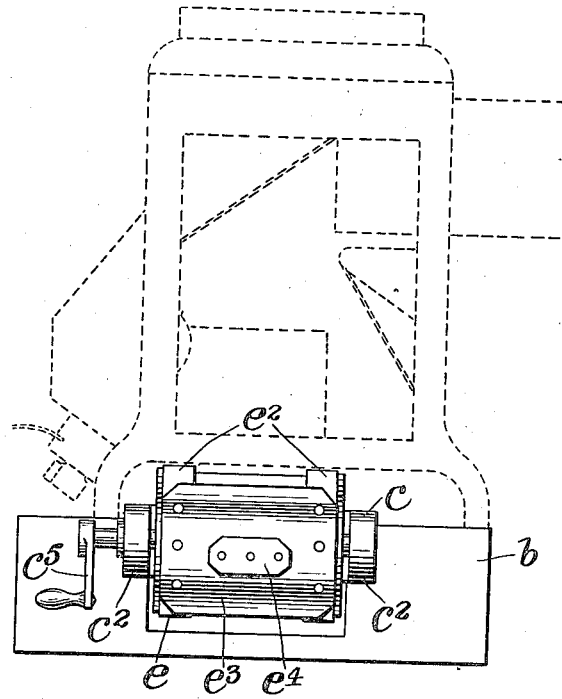

W. L. ISBILLS.
ENDLESS FLEXIBLE PICTURE HOLDER AND CARRIER DEVICE FOR PROJECTOR LANTERNS.
APPLICATION FILED MAR. 6, 1917.
1,258,905.
Patented Mar. 12, 1918.
2 SHEETS—SHEET 1.
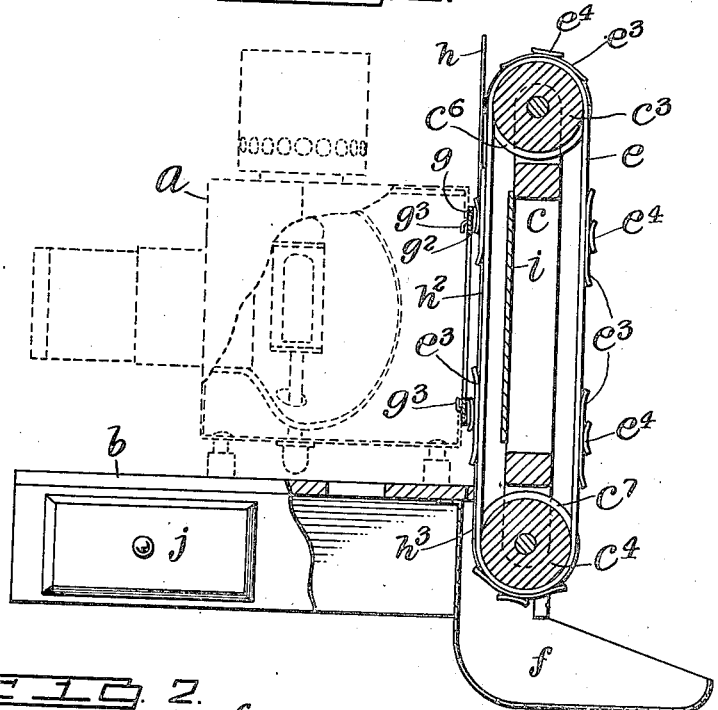
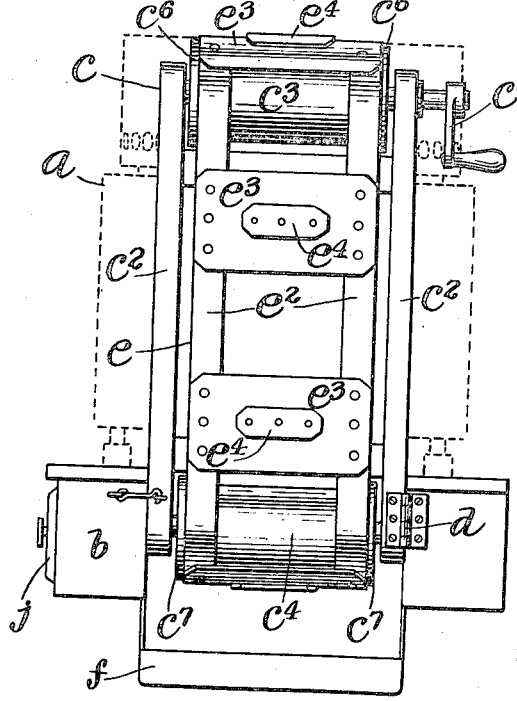
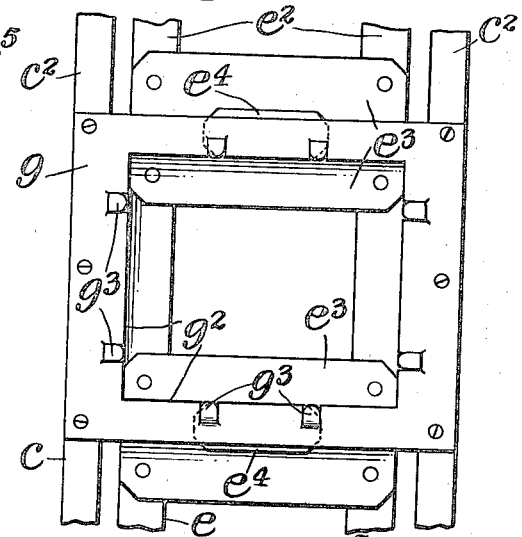
Inventor
William L. Isbills,
By his Attorneys W. L. ISBILLS.
ENDLESS FLEXIBLE PICTURE HOLDER AND CARRIER DEVICE FOR PROJECTOR LANTERNS.
APPLICATION FILED MAR. 6, 1917.

1,258,905.

Patented Mar. 12, 1918.
2 SHEETS—SHEET 2.

Inventor
William L. Isbills,
By his Attorneys

UNITED STATES PATENT OFFICE.

WILLIAM L. ISBILLS, OF BAYONNE, NEW JERSEY.

ENDLESS FLEXIBLE-PICTURE HOLDER AND CARRIER DEVICE FOR PROJECTOR-LANTERNS.

1,258,905.   Specification of Letters Patent.   Patented Mar. 12, 1918.

Application filed March 6, 1917. Serial No. 152,470.

*To all whom it may concern:*

Be it known that I, WILLIAM L. ISBILLS, a citizen of the United States, and residing at Bayonne, in the county of Hudson and State of New Jersey, have invented certain new and useful Improvements in Endless Flexible-Picture Holders and Carrier Devices for Projector-Lanterns, of which the following is a specification, such as will enable those skilled in the art to which it appertains to make and use the same.

This invention relates to what are known as projector lanterns for use in projecting pictures onto a screen for exhibition or other purposes; and the invention more particularly relates to means for supporting or holding the pictures in connection with the lantern body, and the invention described and claimed herein comprises an endless flexible picture holder and carrier independent of but adapted to be placed in connection with the body of a lantern and which may be mounted at the back of the lantern, beneath it, according to the construction and operation of the lantern, or in any other desired position and with which the pictures are connected by hand as the endless carrier is rotated and from which said pictures are automatically discharged during said rotation; and the object of the invention is to provide an improved device of the class specified which is particularly designed for use in the projection or exhibition of pictures on flexible cards or paper such as post cards and the like, but which may also be used for projecting or exhibiting on a screen large photographs and other pictures mounted or printed on stiff cardboard or similar material; and with these and other objects in view, as will hereinafter appear, the invention consists in a device or apparatus of the class specified, constructed and operating as hereinafter described and claimed.

The invention is fully disclosed in the following specification, of which the accompanying drawing forms a part, in which the separate parts of my improvement are designated by suitable reference characters in each of the views, and in which:—

Figure 5:
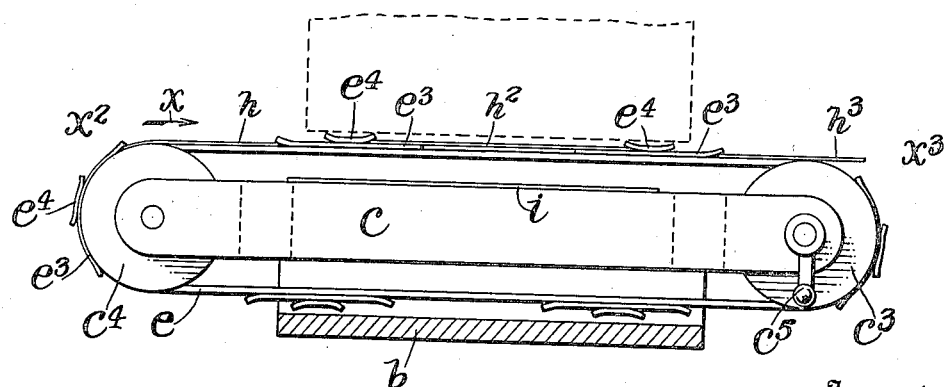

Figure 1 is a side view indicating a well-known form of projector lantern and showing my improvement applied thereto, part of the construction being in section;

Fig. 2 a back view of the device or apparatus as shown in Fig. 1;

Fig. 3 a front view of a part of my improved attachment for projector lanterns and showing a supplemental means for exhibiting large pictures on stiff cardboard or similar material;

Fig. 4 a view similar to Fig. 1 indicating another form of projector lantern and showing a modification in the use of my improvement; and, Fig. 5 a sectional back view of the construction shown in Fig. 4.

In Fig. 1 of the accompanying drawing, I have indicated at $a$ a wellknown form of projector lantern known to the trade as "Radiopticon" and in Figs. 1 to 3 I have shown my improved picture holder and carrier and the method of using it in connection with such a lantern, and the picture holder and carrier shown in these views comprises a frame or support consisting of a horizontal box-shaped base portion $b$ and an upright back frame portion $c$ connected with said base portion and in the use of this form of my improved picture holder and carrier the lantern is placed on the base portion and abuts against the back portion, or said back portion is in contact, or in juxtaposition therewith, and said back portion is hinged to the base portion $b$ at $d$ and may be swung into position for use whenever desired, as shown in Figs. 1 and 2, or may be turned outwardly or laterally, or backwardly on its hinge for any desired purpose.

The upright frame or back portion $c$ is composed of parallel side members $c^2$ in the opposite ends of which, or at the top and bottom of which are mounted a driving roller $c^3$ and a driven roller $c^4$, and the driving roller $c^3$ is provided with a crank $c^5$.

Mounted on the rollers $c^3$ and $c^4$ is an endless carrier $e$ composed, in the form of construction shown, of side belts $e^2$ connected at spaced intervals by transverse flexible picture holding strips $e^3$ which are secured thereto, and with which are connected transverse picture holding clips $e^4$. The opposite side edges of the transverse strips $e^3$ are curved outwardly, or set out from the belt members $e^2$ as shown in Fig. 1, and the opposite side edges of the transverse clips $e^4$ are also curved outwardly or set out from the parts $e^3$ with which they are connected, and the endless belt members $e^2$ are held in position on the rollers $c^3$ and $c^4$ by end flanges $c^6$ and $c^7$ with which said rollers are provided.

The parts $e^3$ and $e^4$ form picture holding clips and in the use of this device the operator inserts the bottom edge of a picture card back of the edge of one of the parts $e^3$ and the top edge of said card back of one of the side edges of another of the parts $e^3$ and turns the endless carrier by means of the crank $c^5$, so as to bring the card in proper position at the back of the lantern where a short stop is made, during which time another card is inserted and the carrier is turned around the rollers $c^4$, and in this operation the card last inserted is brought into the desired position back of the lantern and the card first inserted is dropped out of the carrier into a pan or receptacle $f$ connected, in the construction shown, with the base $b$, and this operation is continued as long as necessary or desirable.

The flexibility of the picture cards facilitate the insertion between the clips $e^3$ as will be readily understood, and this same flexibility causes said cards to be discharged from the carrier as it passes around the roller $c^4$ by reason of the fact that the distance between the clips which hold the card in place is lengthened while the bending of said card does not increase its transverse dimensions, and it will also be understood that larger pictures may be inserted between and held by the strips or clips $e^4$ in the same manner as hereinbefore described, and in this way the operation or process of furnishing or supplying pictures to be projected by the lantern onto a screen is facilitated and made more convenient as will be readily understood, and the rate of movement of the carrier will always be controlled by the crank $c^5$ as will the length of the stops made by said carrier.

I also provide means for exhibiting pictures still larger than those which are intended to be exhibited, or held and carried by the endless carrier and in doing this I secure to the side frame members $c^2$ of the endless holder and carrier device a sheet $g$ having a large central rectangular aperture $g^2$ through which the picture held by the retaining strips or clips $e^3$ and $e^4$ of the endless carrier are exhibited or shown, and the edge portions of the aperture $g^2$ in the sheet $g$ are provided with clips $g^3$, and a large picture to be shown may be inserted between these clips, or such picture may be mounted in a frame or shutter which may be inserted between said clips, but in exhibiting pictures of this class, or mounting them in the sheet frame $g$ for exhibition, they must be taken out by hand as will be readily understood.

In the construction shown in Figs. 4 and 5 I have shown my improved picture holder and carrier device used in connection with what is known in the trade as a "Balopticon" lantern in which the picture to be projected is supported beneath the lantern, and in this use of my improved picture holder and carrier device only the base portion $b$ of the frame or support is used and the endless carrier with which the pictures are connected is mounted in said base portion, which differs slightly in construction from the corresponding part shown in Figs. 1 and 2, and this frame or support $b$ is placed beneath the lantern, or the lantern is placed thereon, and the endless carrier which is of the same construction as that shown in Figs. 1 to 3 inclusive, is rotated horizontally instead of vertically and moves in the direction of the arrow $x$, and in this operation the pictures are inserted into, or connected with the endless carrier at the end $x^2$ of the device and are discharged therefrom at the opposite end $x^3$, or this operation may be reversed, if desired, but in the construction shown in Figs. 4 and 5, the supplemental holder $g$ for pictures of a larger class and mounted or made on stiff cardboard or similar material is not shown.

In Fig. 1 of the accompanying drawing, I have shown at $h$, $h^2$ and $h^3$ card pictures, the central picture $h^2$ being in position for exhibition, while the top picture $h$ is only partly inserted into the carrier and the bottom picture $h^3$ about to be discharged therefrom, and at $h$, $h^2$ and $h^3$ in Fig. 5 I have shown said pictures in the same position.

In Fig. 1 of the accompanying drawing, I have also shown the central portion of the frame of my improved picture holder and carrier closed by a plate $i$ which is designed to prevent the light from the lantern from passing into the back part of the room or compartment in which the lantern is used.

The base $b$ of the frame or support of the holder and carrier device, in the construction shown in Figs. 1 and 2, is provided with a drawer $j$ in which pictures may be stored and, in the construction shown in Figs. 4 and 5, the holder and carrier is mounted in said base, but my invention is not limited to any particular construction of the base $b$, or the support of the lantern, nor to any particular means for mounting the holder and carrier beneath the lantern, and while I have shown and described the construction of my improved picture holder and carrier for use in connection with a lantern or lanterns of the class specified which I prefer, my invention is not limited to the details of said construction as herein shown and described; and changes therein and modifications thereof may be made, within the scope of the appended claims, without departing from the spirit of my invention or sacrificing its advantages.

In the construction shown in Fig. 1 the endless carrier when in use is exposed at the back at the top and also at the front of the top portion thereof, and this exposure and particularly the exposure at the front of the top portion facilitates and renders possible the operation of the device, as herein described, or that part of said operation in which the operator inserts pictures into the endless carrier or connects them therewith, and the top end portions of the endless carrier constructed and used as shown in Figs. 4 and 5 are also exposed in order to permit the operation of inserting the pictures or connecting them with the carrier as herein described and at either end thereof.

From the foregoing description it will be seen that, as shown and described, my improved picture holder and carrier is totally independent of the lantern and has no mechanical connection therewith, or need not have, and in the use of said picture holder and carrier all that is necessary is to place the lantern in connection therewith, or in contact therewith, or in juxtaposition therewith, as herein shown and described, but if desired at any time means may be provided for connecting the picture holder and carrier with the lantern, or the lantern with the picture holder and carrier.

It must be borne in mind that a lantern of the class shown or indicated in Fig. 1 is provided at the back with a picture or picture slide holder into which a picture or picture slide is inserted in the use of the lantern, and in the use of my improved picture holder and carrier device in connection with a lantern of this class, the said picture or picture slide holder, if closed so that the light cannot pass therethrough is detached from the lantern and may afterward, of course, be replaced and the lantern used in the usual way independent of my improved picture holder and carrier; but a lantern of the class shown or indicated in Fig. 4 usually has no picture or picture slide holder at the bottom thereof and the picture or picture slide to be exhibited is placed on the table or other support on which the lantern is placed, but if such a lantern were provided with a picture or picture slide holder it would have to be detached from the lantern when my improved picture holder and carrier was used, if such picture or picture slide holder was closed so as to prevent the passage of light therethrough.

Having fully described my invention, what I claim as new and desire to secure by Letters Patent, is:—

1. An endless picture holder and carrier device for use in connection with a projector lantern, said device being independent of the lantern in construction and being adapted to be connected therewith, and comprising a frame or support in which is mounted an endless belt carrier, means whereby said carrier may be intermittently rotated, and means whereby pictures to be exhibited may be connected by hand with said carrier as it is rotated.

2. An endless picture holder and carrier device for use in connection with a projector lantern, said device being independent of the lantern in construction and being adapted to be placed in connection therewith, and comprising a frame or support in which is mounted an endless belt carrier adapted to be rotated by hand and with which pictures to be exhibited are connected by hand as the carrier is rotated and from which said pictures are automatically discharged.

3. An endless picture holder and carrier device for use in connection with a projector lantern, said device being independent of the lantern in construction but adapted to be placed in connection with the body of the lantern, and comprising a frame or support in which is mounted an endless belt carrier adapted to be rotated by hand and provided at spaced intervals with picture holding devices of different dimensions and with which pictures to be exhibited are connected by hand as the carrier is rotated and from which said pictures are automatically discharged as the carrier is rotated.

4. An endless picture holder and carrier device for use in connection with a projector lantern, said device being independent of the lantern in construction and being adapted to be placed in connection with the body of the lantern when in use and comprising a frame in which is mounted an endless belt carrier adapted to be rotated by hand and having spaced picture holding devices with which pictures are adapted to be connected by hand as the carrier is rotated and from which said pictures are automatically discharged during said rotation.

5. An endless picture holder and carrier device for use in connection with a projector lantern, said device being independent of the lantern in construction but adapted to be placed in connection with the body of the lantern when in use, and comprising a frame or support, a supplemental frame mounted in connection with said frame or support and an endless belt carrier rotatably mounted in said supplemental frame and with which pictures to be exhibited are connected by hand as the carrier is rotated, one end portion of said carrier being exposed when in use to permit of the connection of pictures therewith.

6. An endless picture holder and carrier device for use in connection with a projector lantern, said device being independent in construction of the lantern but adapted to be placed in connection with the body of the lantern when in use, and comprising a frame or support in connection with which is mounted an endless belt carrier adapted to be rotated by hand and provided at intervals with picture holding devices of different dimensions with which pictures of different dimensions to be exhibited are connected by hand as the carrier is rotated and from which said pictures are automatically discharged, a portion of the carrier being exposed when in use to permit of the connection of pictures therewith.

7. An endless picture holder and carrier device for use in connection with a projector lantern, said device being independent of the lantern in construction and being adapted to be placed in connection therewith, and comprising a frame or support in which is mounted an endless belt carrier adapted to be rotated by hand and with which pictures to be exhibited are connected by hand as the carrier is rotated and from which said pictures are automatically discharged, said frame or support being also provided with stationary picture holding devices.

8. An endless picture holder and carrier device for use in connection with a projector lantern, said device being independent of the lantern in construction and being adapted to be connected therewith, and comprising a frame or support in which is mounted an endless belt carrier, means whereby said carrier may be intermittently rotated by hand, and means whereby pictures to be exhibited may be connected by hand with said carrier as it is rotated.

In testimony that I claim the foregoing as my invention I have signed my name in presence of the subscribing witnesses this 3rd day of March 1917.

WILLIAM L. ISBILLS.

Witnesses:
C. E. MULREANY,
H. E. THOMPSON.